(12) United States Patent
Guercioni

(10) Patent No.: US 7,480,987 B1
(45) Date of Patent: Jan. 27, 2009

(54) METHOD FOR PRE-FORMING CONDUCTORS FOR MOTOR ROTORS AND STATORS

(75) Inventor: Sante Guercioni, Teramo (IT)

(73) Assignee: Tecnomatic, S.p.A., Teramo (IT)

( * ) Notice: Subject to any disclaimer, the term of this patent is extended or adjusted under 35 U.S.C. 154(b) by 166 days.

(21) Appl. No.: 11/728,106

(22) Filed: Mar. 22, 2007

(51) Int. Cl.
 *H01R 43/00* (2006.01)
(52) U.S. Cl. .................. 29/825; 29/592.1; 29/596; 29/732; 29/874; 29/882
(58) Field of Classification Search ............... 29/592.1, 29/596, 732, 825, 874, 882
 See application file for complete search history.

(56) References Cited

U.S. PATENT DOCUMENTS

| | | | | |
|---|---|---|---|---|
| 2,387,885 | A * | 10/1945 | Davis | 310/233 |
| 2,400,739 | A * | 5/1946 | Burge | 242/559.1 |
| 2,476,743 | A * | 7/1949 | Leece | 72/382 |
| 4,437,230 | A * | 3/1984 | Greutmann | 29/597 |
| 5,522,125 | A * | 6/1996 | Bradtmueller et al. | 29/598 |
| 6,249,956 | B1 * | 6/2001 | Maeda et al. | 29/596 |
| 6,314,780 | B1 * | 11/2001 | Naka et al. | 72/213 |
| 6,339,871 | B1 * | 1/2002 | Maesoba et al. | 29/596 |
| 6,698,983 | B1 * | 3/2004 | Kiernan et al. | 410/23 |
| 6,885,123 | B2 * | 4/2005 | Gorohata et al. | 310/201 |
| 7,140,098 | B2 * | 11/2006 | Maeda et al. | 29/732 |
| 7,210,215 | B2 * | 5/2007 | Kato et al. | 29/596 |
| 7,293,350 | B2 * | 11/2007 | Sawada | 29/732 |
| 7,302,750 | B2 * | 12/2007 | Niimi et al. | 29/598 |

* cited by examiner

*Primary Examiner*—C. J Arbes
(74) *Attorney, Agent, or Firm*—Blakely Sokoloff Taylor & Zafman LLP

(57) ABSTRACT

Method and apparatus for pre-forming insulated conductors for motor rotors and stators for use in a next process in forming motor rotors and stators. In accordance with the full exemplary process, insulated rectangular cross-section wire is received from a spool, straightened, stripped over a predetermined length, fed to a bender, cut to length and then bent into the desired hairpin shape and placed on a feeder for the next process. The method and apparatus may be fully automatic, including automatically adjusting itself as required to make hairpin shaped conductors of different lengths, each length having its free ends stripped over a desired length. The method and apparatus for bending, as well as other methods and apparatus disclosed, may be used alone or in other combinations.

23 Claims, 8 Drawing Sheets

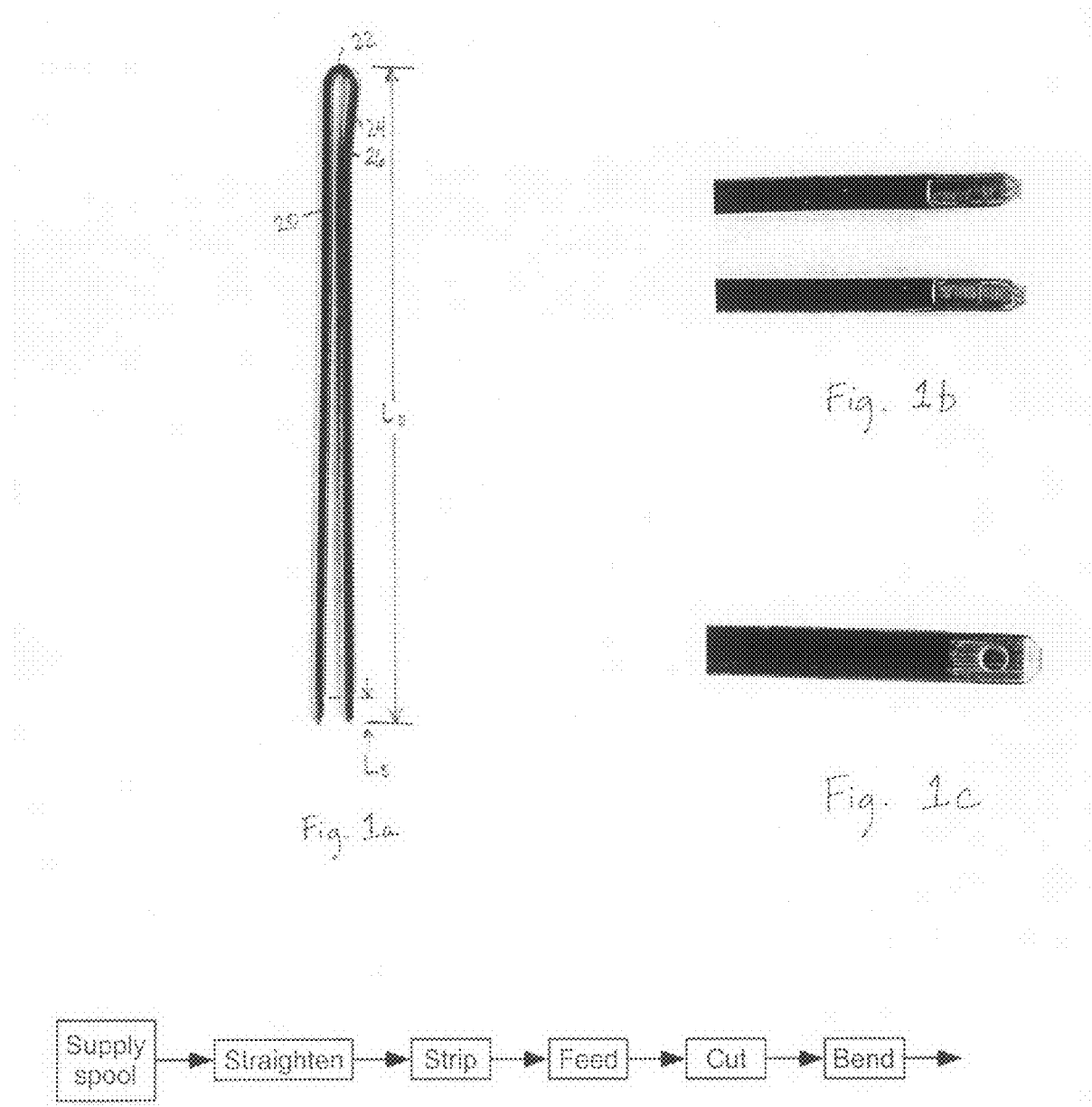

METHOD FOR PRE-FORMING CONDUCTORS FOR MOTOR ROTORS AND STATORS

BACKGROUND OF THE INVENTION

1. Field of the Invention

The present invention relates to the field of electric motors.

2. Prior Art

Tecnomatic S.p.A., assignee of the present invention, has in the past made a limited number of motor stators and D.C. motor rotors using flat or square wire for the windings. In that regard, it is to be noted that as used herein, "flat" or "square" wire means wire having four substantially flat sides, each joined to adjacent sides, typically by a rounded edge. In the case of square wire, the wire may be formed in the square shape and then coated with typical winding insulation, or in some cases, pre-coated round wire has been rolled into the square shape. Rolling of round wire to a square shape has definite limits if the insulation is not to be damaged, though smaller rounded edges may be achieved if the wire is first formed by drawing or otherwise formed into the square shape and then coated. Even if the wire is first formed in the desired shape and then coated, some degree of rounding on the edges is desired for various reasons, including prevention of surface tension from pulling the coating away from the sharp edges during coating, preventing the sharp edges from cutting through the coating afterward, and preventing electric field concentration on the sharp edges to induce early breakdown. Thus, as used herein, the words "square" or "flat" or equivalent words used to describe the cross-section of an insulated copper wire are used in the general sense and are not to be construed as excluding significant or substantial rounded corners joining the substantially flat sides. "Flat" as used herein and in the claims means having two opposite sides having a greater separation than the other two opposite sides, its width being greater than its thickness. "Straight" as used herein and in the claims means substantially free of bends. Accordingly, either a flat or a square conductor may or may not be straight. "Rectangular" as used herein is a more general term meaning flat or square, square being a special case of rectangular wherein the dimension between two opposite sides is equal to the dimension between the other two opposite sides.

In the prior art stators, the wire has been cut to the desired length and stripped, then bent into a hairpin shape by hand on a one at a time basis, then the two legs of the hairpin separated one hairpin at a time and hand inserted into one end of a stator, with the stripped ends of the wires sticking out of the other end of the stator being all bent all in one row uniformly in one direction and all in the adjacent row uniformly bent in the opposite direction so interconnection of wires in the two rows forming a given phase could be welded, one at a time, to provide the stator windings. However, to bring out the connections to the phases, and to interconnect phases, the corresponding wires needed to be re-bent to isolate them from the connections within each phase, something again previously done by hand.

The use of the flat or square wire for the windings produces very efficient and high power to weight ratio motors because of the greater cross-section of copper that can be put into a winding slot. However, the procedure described above is slow and highly labor intensive, and not suitable for a mass produced motor.

BRIEF DESCRIPTION OF THE DRAWINGS

FIG. 1a is a view of an exemplary hairpin conductor that may be fabricated in accordance with the method and apparatus of the present invention.

FIG. 1b is an exploded view of the ends of the hairpin conductor of FIG. 1a taken in the plane of the hairpin shape.

FIG. 1c is an exploded view of an end of the hairpin conductor of FIG. 1a taken in the plane of the wide dimension of the rectangular shaped conductor wire.

FIG. 2 is an exemplary process sequence for the present invention.

DETAILED DESCRIPTION OF THE PREFERRED EMBODIMENTS

Figure 3:
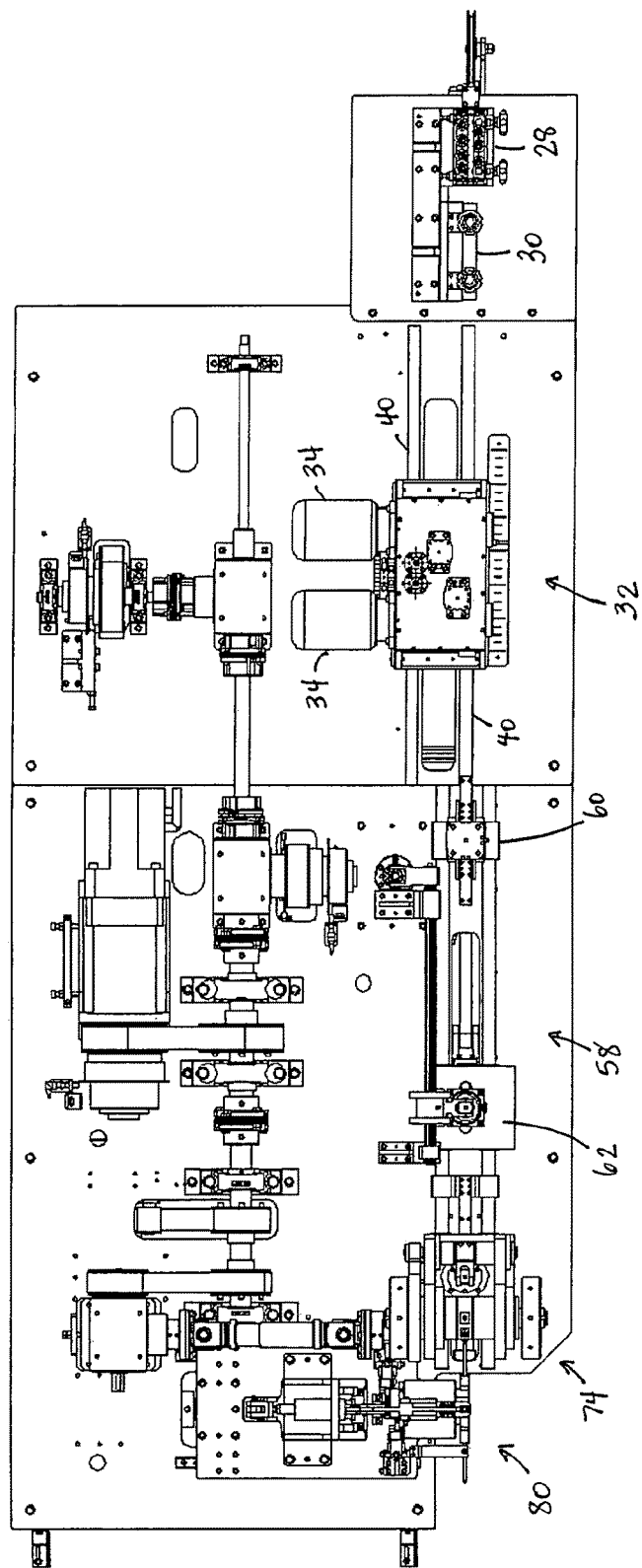
FIGS. 3 and 4 are top and side views, respectively, of exemplary apparatus for practicing the present invention.

In the description of preferred embodiments of the present invention to follow, the terms "flat", "square", "rectangular" and "straight" will be used. Unless otherwise apparent, such terms are used in accordance with the definitions thereof set forth in the prior art section above.

The purpose of the present invention is to automatically form the hairpin shaped conductors of rectangular wire for automatically manufacturing motor rotors and stators of the type described above. An exemplary hairpin conductor may be seen in FIG. 1a and is characterized by an overall length $L_O$, formed by bending a rectangular insulated conductor with the ends thereof being stripped of insulation over the length $L_S$. The typical insulation on the hairpin conductors is a typical motor or solenoid winding insulation well known in the motor art. In a preferred embodiment of the invention, one side 20 of the hairpin conductor as formed is substantially flat up to the loop 22, with the upper portion 24 of the other side of the hairpin being bent initially to touch or almost touch the opposite leg of the hairpin, resulting in a slight outward bend in region 26, which together with spring back after bending, results in the lower ends of the hairpin shape being somewhat separated, but elastically deformable into contact or near contact with each other. In the preferred embodiment this is desired, as this separation, coupled with the elasticity of the bent conductor, is used in a subsequent process for forming motor rotors and stators. The rectangular wire in one stator embodiment has a cross-section having a width of 4.4 millimeters and a thickness of 3.0 millimeters measured over the insulation, and is used for the fabrication of a 65 kilowatt three-phase AC motor. Obviously these dimensions are representative of one motor only, as the dimensions will vary depending on the motor design and power. In the exemplary stator, the dimension $L_S$ for the particular hairpin conductor illustrated is approximately 18.1 cm, though as shall subsequently be seen, the exemplary stator uses hairpin conductors of two similar but slightly different overall lengths. The stripped length $L_S$ in the exemplary stator is approximately 7.5 millimeters across the width (larger dimension) of the hairpin conductors, though the stripped length across the thickness of the exemplary hairpin conductors is slightly less.

The general process for forming the hairpin shaped conductors of FIG. 1a is outlined in FIG. 2. The rectangular wire preferably is provided in rolled up but untwisted form on a relatively large spool, which in the preferred embodiment is held for rotation around a horizontal axis. The wire proceeds from the spool through wire straighteners, then through a stripper, a feeder, a cutter and a hairpin conductor bender to form the hairpin shaped conductor, which is then ejected onto a feeder for the next operation in the assembly of a motor rotor or stator. Each of these operations shall be described in greater detail below.

The supply spool in a preferred process to provide the rectangular insulated wire to the wire straighteners is motor driven responsive to the use of the wire in the present invention. This provides the required wire without any substantial tension therein. Thus tension on the wire within the process is substantially constant at each stage of the process, avoiding irregular elongation of the wire or slippage thereof in the feeder.

Figure 4:
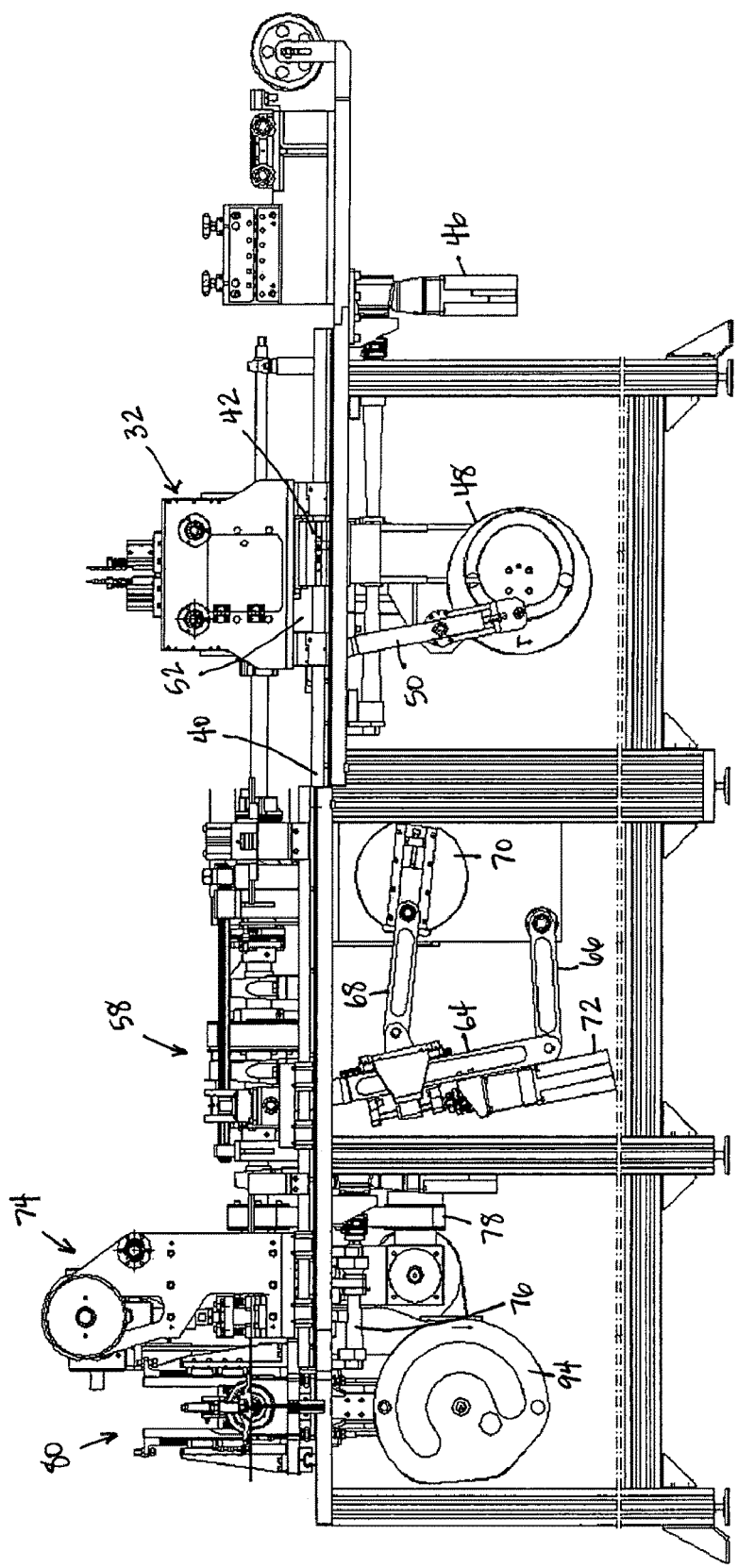
Figure 5:
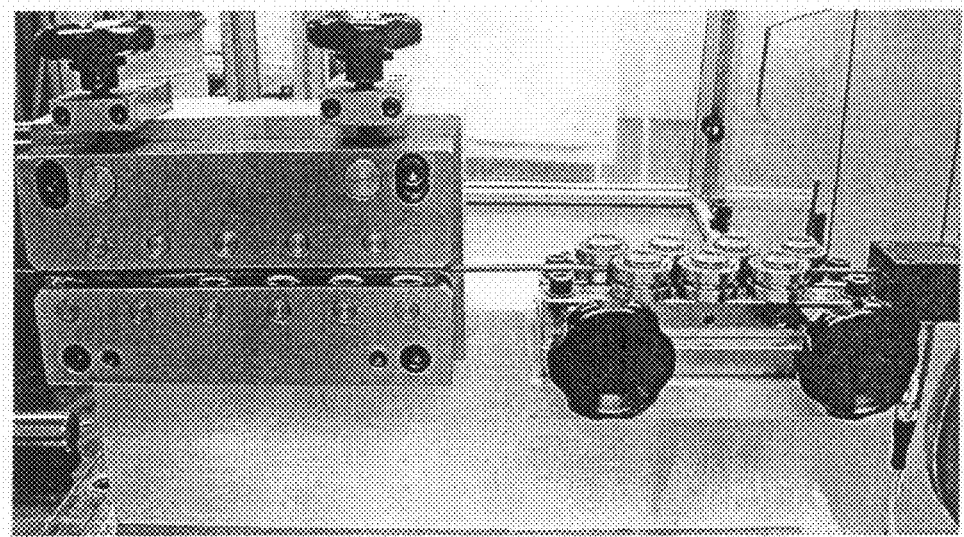
FIG. 5 is a view of the straighteners used with the present invention.

FIGS. 3 and 4 are top views and side views of an exemplary embodiment of the present invention. The wire is fed from the spool with the wider part horizontally disposed. The straighteners 28 and 30 are of conventional design, positioned to straighten the wire first in the horizontal direction (straightener 28) and then in the vertical direction (straightener 30) by repeatedly bending the wire back and forth in the corresponding direction, but by decreasing amounts until the wire emerges from the straightener straight, at least in the direction of the respective straightener. In the preferred embodiment, the straighteners are adjustable. A view of the straighteners of one embodiment may be seen in FIG. 5.

Figure 6:
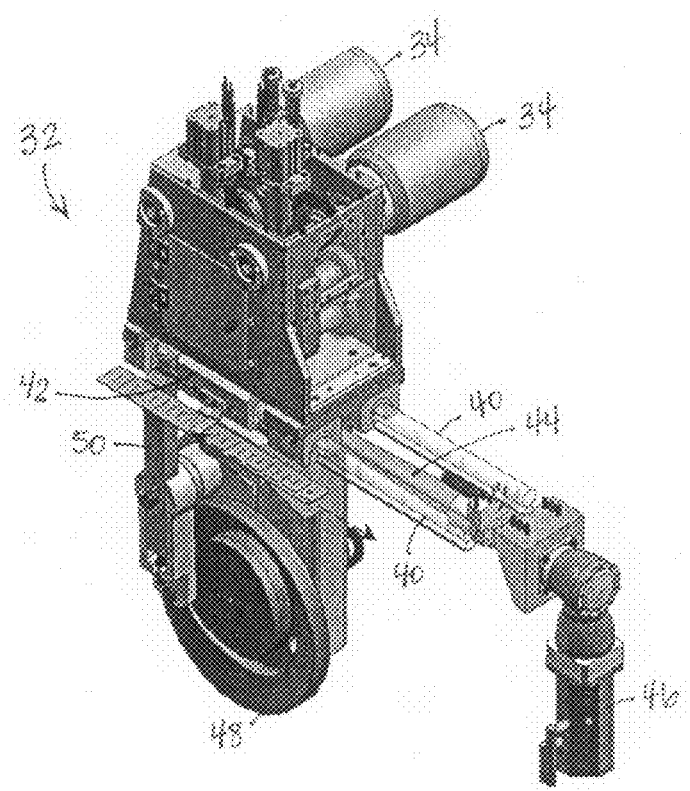
FIGS. 6 through 8 show details of the stripper of the exemplary embodiment.

Following the straighteners in the wire flow direction in FIGS. 3 and 4 is the stripper, generally indicated by the numeral 32. As effectively noted before, the strippers in this embodiment remove the insulation from the top and bottom surfaces (width) of the insulated conductor. In this embodiment, the strippers are diamond coated wheels 36 (FIG. 7), one above and one below the wire 38, each driven by a respective one of motors 34 (FIGS. 3 and 6).

The stripper 32 (FIGS. 3, 4 and 6) is mounted on slide rails 40 for controllable translation back and forth along the slide bars. A drive carrier 42 (FIGS. 4 and 6) is also mounted on the slide rails 40 and is positioned at selectable fixed positions along the slide rails by lead screw 44 (FIG. 6) controlled by servomotor 46. The drive carrier supports a cam wheel 48 therebelow, with a cam follower controlling pivot arm 50 for sliding the stripper assembly 32 back and forth along slide rails 40 within the limit of the travel in space 52, the difference between the width of the drive carrier 40 and the spacing between the slides on the stripper assembly 32. Thus with this combination, servomotor 46 may controllably position the stripper assembly 32 at any position along the slide rails 40 so that the position of the stripping may be adjusted as necessary, as shall be subsequently described.

Figure 7:
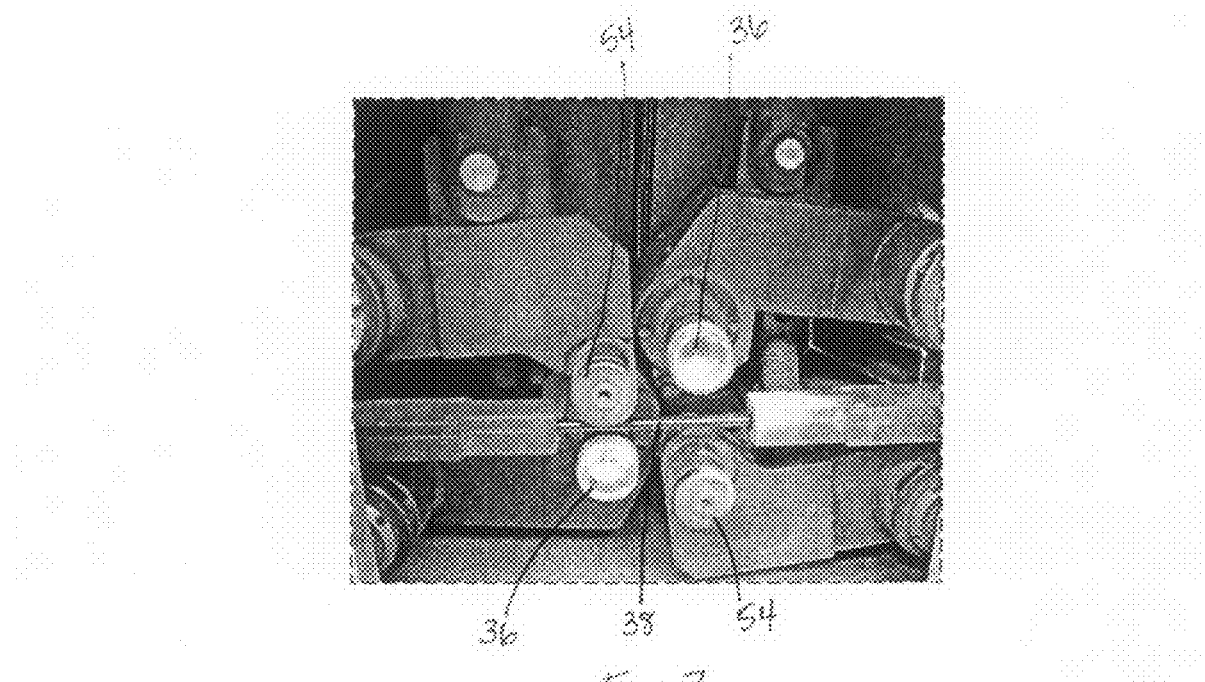
Figure 8:
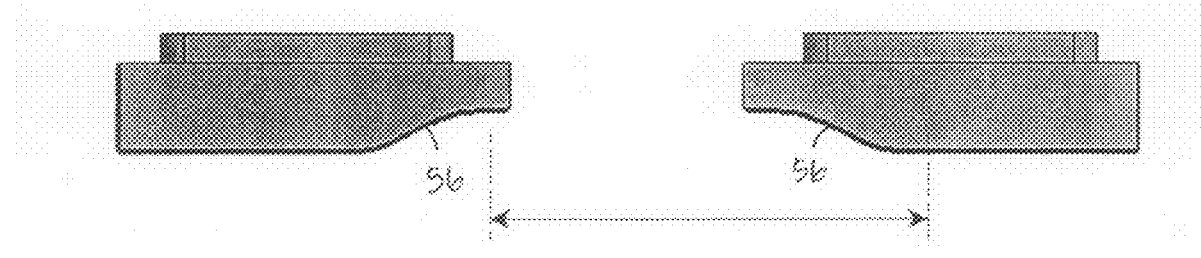
Figure 9:
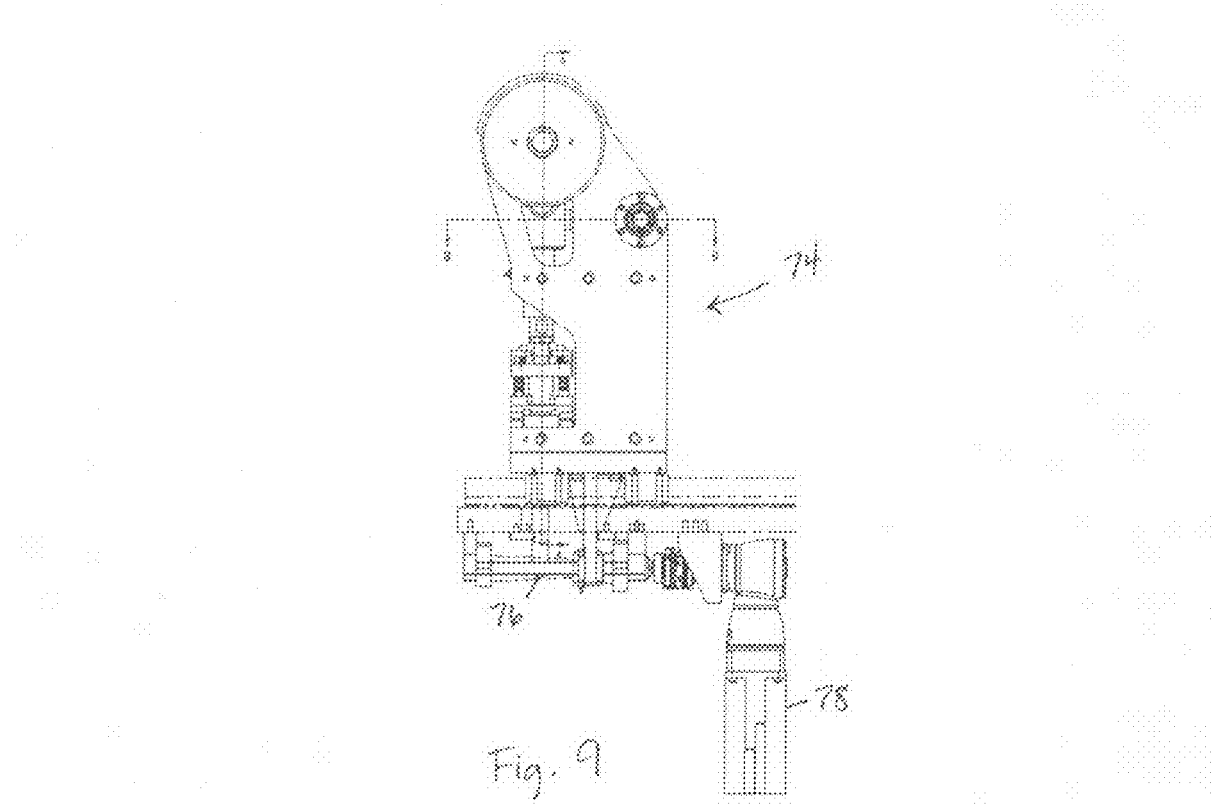
FIG. 9 is a side view of the cutting station of the exemplary embodiment.

In operation, cam wheel 48 makes one complete turn for each stripping event, sliding the stripper assembly 32 first to the right (FIG. 4) and then back to its leftmost position shown in the Figure. On movement in one direction, one of diamond wheels 36 is moved to engage the insulated wire 38 to strip one side of the insulated wire 38, with a backup roller 54 supporting the opposite side of the insulated wire 38 (FIG. 7), with the opposite diamond wheel 36 and backup roller 54 stripping the other side of the insulated wire 38 on movement of the stripper assembly 32 in the opposite direction. The movement of the two diamond wheels 36 and backup rollers 54, as seen in FIG. 7, is controlled by pneumatic actuators having adjustable stops to assure proper stripping of the wire, with the length of the stripping being defined by cam surfaces 56 (FIG. 8) mounted on the drive carrier 42 (FIG. 4). The actual length of wire stripped in the preferred embodiment is somewhat greater than twice the length $L_S$ (FIG. 1a), the length of the stripped ends of the hairpin conductors.

In the preferred embodiment process, the feeding operation for the wire occurs after the stripping (FIG. 2), the same being accomplished by the feeder generally indicated by the numeral 58 in FIGS. 3 and 4. The feeder is comprised of two functional elements, namely, a fixed wire grabber 60 (FIG. 3) and a moveable wire grabber 62 mounted for sliding motion back and forth along the direction of travel of the wire. Grabber 62 pinches the wire with sufficient force to be able to reliably draw the wire through straighteners 28 and 30 and along the path of travel through the remainder of the system. The position of the movable grabber 62 is controlled by an arm 64 (FIG. 4) pivotably mounted to the movable grabber 62, the arm 64 being free to move in the vertical direction as required during the linear motion by arm 66 and being driven back and forth by a connecting arm 68. The movement of movable wire grabber 62 in the preferred embodiment is adequate to feed the required length of wire required for each hairpin conductor of FIG. 1a by a single rotation of crank wheel 70. A servomotor 72 controls the pivot position of the connection of arm 64 to connecting arm 68, which in turn controls the stroke of the movable wire grabber 62. Thus the amount of wire fed on each rotation of crank wheel 70 may be automatically controlled by control of servomotor 72. The fixed grabber and the movable grabber are coordinated in operation so that the wire is retained at least by one of the two grabbers at all times, the fixed grabber releasing after the movable grabber grabs the wire, with the fixed grabber grabbing the wire again before the movable grabber releases the wire at the end of its stroke prior to returning to its initial position.

The next step in the processing sequence is to cut the wire to length (see FIG. 2) as required for the particular hairpin conductors being formed. The cutter, generally indicated by the numeral 74 in FIGS. 3 and 4, is a simple cam driven punch and die set which punches out a very short length of the wire in the middle of a stripped section thereof to separate the wire into two pieces at that point, and at the same time, trims the edges of each end over the approximate length of $L_S$ (FIG. 1a) to assure removal of the insulation remaining on the edges of the wire. It also at the same time presses the ends adjacent the cuts to form a taper in a first direction at the cuts, as shown in FIG. 1b, and tapers the edges at the cut by the punch and die, as may be seen in FIG. 1c. The net result is a tapering of the ends to the hairpin conductors in each plane at the ends thereof. In that regard, the amount of trimming at the edges by the punch and die, except immediately adjacent the very ends, and the extent of material removal by the diamond cutters in the cutter assembly 32, is preferably limited to the least amount that adequately ensures that the insulation is removed from the ends. While the removal of some conductor material from the ends of the length of wire used to form the hairpin of FIG. 1 reduces the cross-sectional area of the wire in that region, the effective length of this reduced area, together with the limited reduction in cross-sectional area, has very little effect on the resistance of the finished winding. Removal of a very short section of the stripped wire by the punch and die allows the positive support of the resulting two ends of the wire to avoid bending the wire in the cutting operation.

The cutting assembly 74 is itself mounted on a slide and coupled to lead screw 76 powered by stepper motor 78 so that the cutting assembly may also be automatically positioned for the length of the hairpin conductor being formed. In that regard, since in the preferred embodiment the lengths of the hairpin conductors formed do not differ dramatically, the amount of motion of the cutting assembly 74 need not be large to accommodate this variation.

The bender 80 (FIGS. 3, 10a and 10b) is itself mounted on slides 81 (FIG. 10a) for some controlled movement along the direction of the path of travel of the wire through the system. The bender 80 is cam driven from pulley 83 which not only drives cam 94, but also drives cams 85 and 87. Cam 85 controls the movement of the bender 80 along the direction of the path of travel of the wire between a leftmost position (relative to the orientation shown in FIG. 3) and a rightmost position. Cam 87 controls an ejector 100 through a linear cam 89, the function of which will be subsequently described.

Figure 10A:
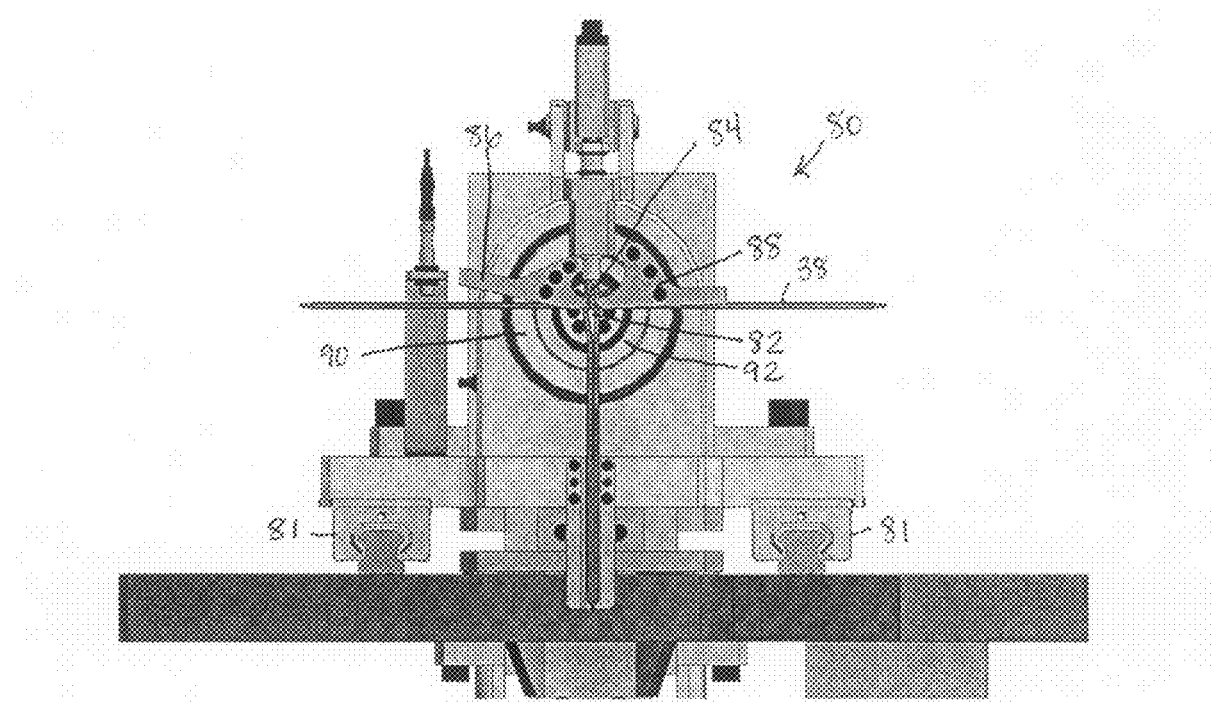
FIGS. 10a, 10b and 11 through 13 show details of the bender of the exemplary embodiment.
Figure 10B:
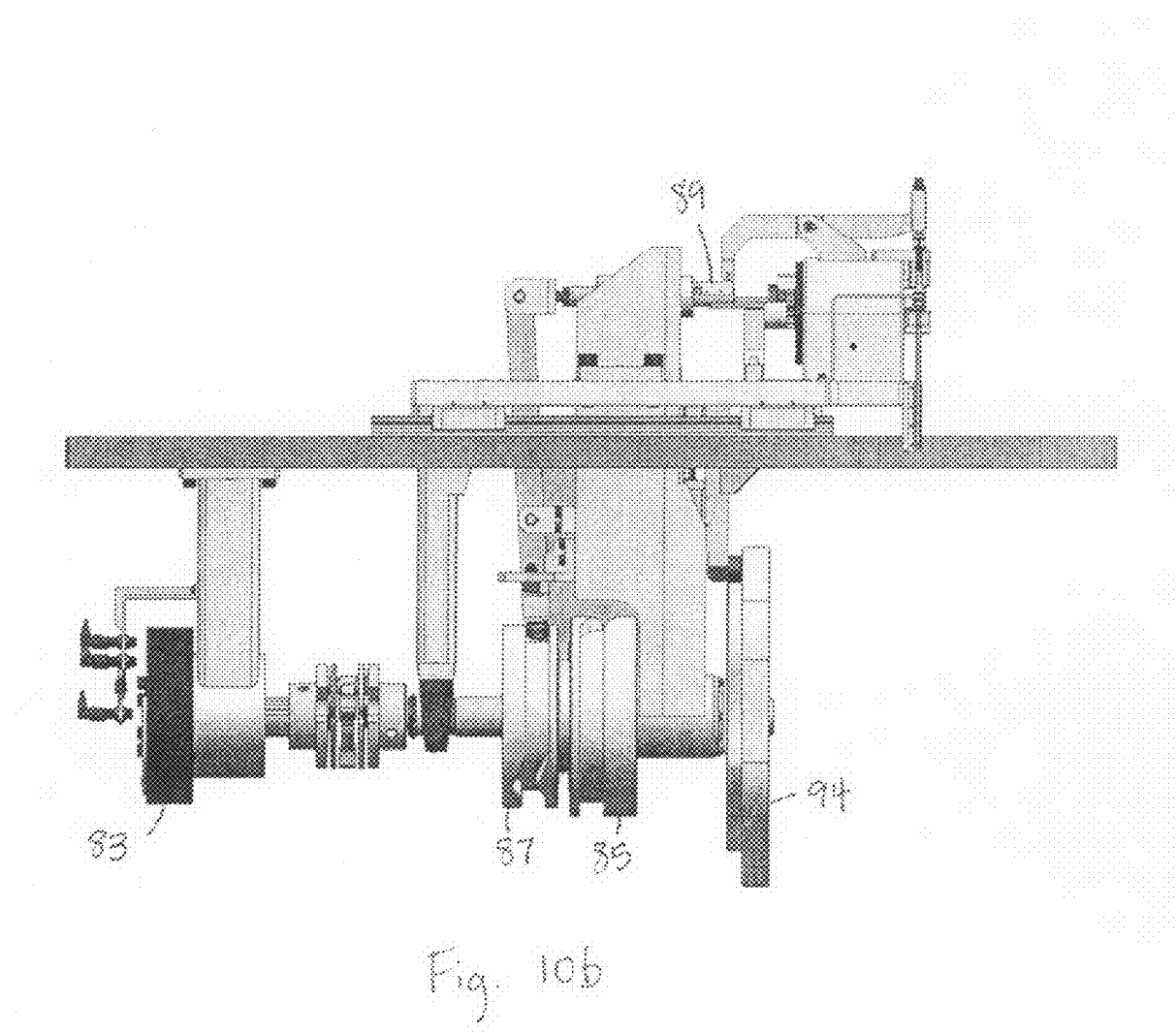

Before the wire is cut in the middle of a stripped section, and with bender 80 at its rightmost position along the direction of the path of travel of the wire (FIG. 3), the wire moves to the bender 80 so that the middle of the wire 38 is centered over a shaping member 82 on the bender (see FIG. 10a). In that regard, FIG. 10a shows the stripped length of wire 38 centered over shaping member 82 as well as an already bent wire, although obviously only one or the other will be on shaping member 82 at any one time. Once the wire is positioned as shown in FIG. 10, a stopper or retainer 84 is extended downward to retain the wire at that position by cams 87 and 89 (FIG. 10b) before the cutting operation is carried out by the shaft connected to the gearbox and the eccentric. After cutting, the bender 80 is moved perpendicularly to the direction of the path of travel of the wire to its backmost position to move the just cut wire away from and free of the cutter die to facilitate the bending of the conductor. To assure alignment of the wire after cutting and during bending, forming members 86 and 88 are slotted to retain alignment of the section of the wire 38 once separated from the rest of the wire in the system.

Figure 11:
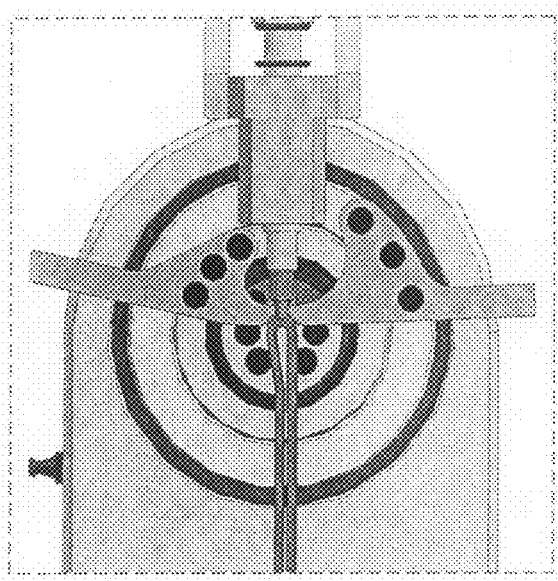
Figure 13:
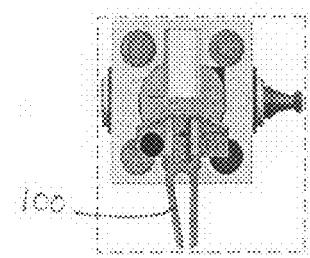
Figure 12:
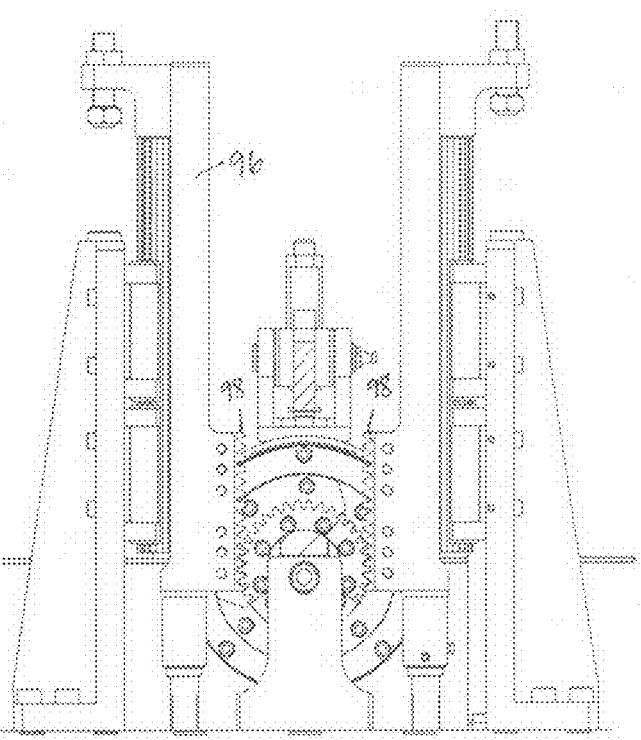

For forming the hairpin conductor, ring 90 on which forming member 88 is fastened, rotates in a clockwise direction and ring 92 on which forming member 86 is mounted is equally rotated in a counterclockwise direction to form the hairpin conductor as shown. These members are also shown in FIG. 11 on an expanded scale.

As may be seen in FIG. 4, the wire bender is cam driven from below by cam wheel 94 to pull yoke 96 downward, with racks 98 each driving a respective one of two equal size gears in opposite directions, the gears being connected to rings 90 and 92, respectively, to rotate the forming members 86 and 88 as described. Once formed, the bender 80 is again moved to its frontmost "zero" position and an ejector 100 is energized by cam 87 (FIG. 10b) to extend and push the hairpin conductor off of shaping member 82 and onto a feeder, the feeder being in the form of a vertical metal sheet with an inclined top which feeds the hairpin conductors to the next operation of the manufacturing process, in the preferred embodiment by gravity as a result of the incline. That feeder is aligned with the shaping member 82 on the bender (see FIG. 10a) when the bender 80 is in its front position, and does not travel back and forth with the bender 80.

Having now described the overall process and apparatus for forming the hairpin conductors, the sequence of operations will now be reviewed. First, depending on the length of the stripped section of wire required for forming a hairpin conductor, the position of the cutter, the stroke of the feeder and the position of the stripper are set. Once a prior formed hairpin conductor has been ejected from the bender, the feeder will feed the required length of wire for the next hairpin conductor, also accounting for the short section of wire to be removed by the cutter. Once the wire is retained by the stationary wire grabber 60 (FIG. 3), the stripper may be activated, and once the wire retainer 84 of the bender has retained the section of wire in the bender, the cutter may be activated. Then the bender 80 is moved to a back position to provide clearance for the bending of the cut section of wire. After bending, the bender 80 is returned to its front position and the respective hairpin conductor is ejected. Then the feeder may feed a further length of wire for repeating the process.

The assembly at the upper part of FIG. 3 and some of the assembly visible in FIG. 4 are part of the drive system for the various stations in the exemplary embodiment hairpin conductor fabrication process. While the specific drive system itself is not part of the present invention, and accordingly need not be described in detail, generally speaking that drive system is comprised of motors, stepper motors, linear and rotary cams and cam followers, and pneumatic actuators, all operating under program control, though of course other drive mechanisms, such as by way of example, hydraulic actuators, could be used if desired. Also, there could be variations in the sequence of operations illustrated with respect to FIG. 2. By way of example, the feeder could be positioned prior to the stripper, though it is preferred to have the feeder after the stripper to pull the wire through, as opposed to pushing the wire through. Also by way of example, the cutter may be moved rather than the bender to provide clearance for the bending operation, if desired. Other variations may also be incorporated as desired.

The preferred embodiment is used to provide hairpin conductors of two different lengths, specifically forming a first number of hairpin conductors of a first length and then a second number of hairpin conductors of a somewhat different length. In the preferred embodiment the control system keeps track of the number of hairpin conductors formed of a first length and then automatically repositions the cutter and stripper and readjusts the feeder for forming the second number of hairpin conductors of the second length before again forming another first number of hairpin conductors of the first length. Accordingly, operation of the system is totally automated, going from rectangular wire on a spool to stripped hairpin conductors of the desired length on an automatic feeder to the next operation of the manufacturing process without operator intervention.

The present invention has been disclosed herein by way of a preferred method and apparatus, though that is to be understood to be exemplary only, and not limiting of the invention. Thus while a certain preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A method of preforming rectangular conductors for use in a process for forming a motor winding comprising:
   a) automatically providing insulated rectangular and straightened conductors having the insulation removed from their ends;
   b) automatically feeding the conductors to a shaping member, and bending the conductors around the shaping member to form the conductors into hairpin shaped preformed conductors, each having a loop integrally coupling first and second legs of the preformed conductor;

c) automatically ejecting the preformed conductors from the shaping member onto a feeder for the next operation in the process.

2. The method of claim 1 wherein the conductors are bent around the shaping member by counter rotating forming members.

3. The method of claim 2 wherein one forming member maintains the first leg of each preformed conductor straight, and the other forming member bends the second leg of each preformed conductor back to contact the first side of the preformed conductor, whereby the loops of the preformed conductors are not symmetrical about the two respective legs, the two legs of each preformed conductor springing apart after forming as a result of the residual stress in the preformed conductor.

4. The method of claim 1 wherein in a), the insulated rectangular and straightened conductors with the insulation removed from their ends are provided by straightening insulated and rectangular wire provided from a roll, locally grinding two opposite sides of the wire to remove the insulation from the respective sides over a predetermined length and with predetermined spacing on the wire, and cutting the wire in the middle of the grinding so as to cut the conductor from the wire and remove the insulation from the other two opposite sides of the conductor.

5. The method of claim 4 wherein the conductors are retained and the grinding over the predetermined length is done by movement of a grinder along the direction of travel of the conductor.

6. The method of claim 4 wherein the cutting is done using a punch and die, the cutting including removing a portion of the wire in the middle of regions in which the insulation has been removed from two sides while supporting the wire adjacent each side of the cut.

7. The method of claim 6 wherein the cutting forms and presses the cut ends of the wire to taper the ends as cut.

8. The method of claim 6 wherein the feeding of the wire is done using a feeder having a fixed wire grabber and a moveable wire grabber, the feeder being positioned to feed the wire from a position after the wire is straightened and ground.

9. The method of claim 8 wherein the moveable wire grabber is configured to feed a length of wire equal to a length of conductor to be bent into the hairpin shaped preformed conductor plus the length of the portion of the wire removed by the punch and die by a single stroke of the moveable wire grabber.

10. The method of claim 9 wherein the stroke of the moveable wire grabber, the position of the grinder and the position of the cutter along the path of travel of the conductor are automatically variable to controllably vary the predetermined spacing on the conductor, thereby controllably providing conductors of at least two different lengths.

11. The method of claim 6 further comprised of actuating a wire retainer before the cutting, the wire retainer being disposed to retain a length of conductor on the shaping member, and increasing the spacing between the punch and die and the shaping member before bending the conductor around the shaping member.

12. The method of claim 11 wherein increasing the spacing between the cutter and the shaping member is done by moving the shaping member.

13. A method of preforming rectangular conductors for use in a process for forming a motor winding comprising, as an automatic process:

a) removing insulated rectangular wire from a roll of insulated rectangular wire;

b) straightening the insulated wire;

c) removing the insulation from two opposite sides of the wire over a predetermined length and at locations on the wire having a predetermined spacing;

d) cutting the wire into separate conductors in the middle of the locations in which the insulation has been removed;

e) feeding the conductors to a shaping member;

f) bending the conductors around the shaping member to form the conductors into hairpin shaped preformed conductors, each having a loop integrally coupling first and second legs of the preformed conductor;

g) automatically ejecting the preformed conductors from the shaping member and feeding the preformed conductors onto a feeder for the next operation in the process.

14. The method of claim 13 wherein the conductor is retained and the insulation over the predetermined length removed by movement of a grinder along the direction of travel of the conductor.

15. The method of claim 13 wherein the conductors are bent around the shaping member by counter rotating forming members.

16. The method of claim 15 wherein one forming member maintains the first leg of each preformed conductor straight, and the other forming member bends the second leg of each preformed conductor back to contact the first side of the preformed conductor, whereby the loops of the preformed conductors are not symmetrical about the two respective legs, the two legs of each preformed conductor springing apart after forming as a result of the residual stress in the preformed conductor.

17. The method of claim 13 wherein the cutting is done using a punch and die, the cutting including removing a portion of the wire in the middle of regions in which the insulation has been removed from two sides while supporting the wire adjacent each side of the cut.

18. The method of claim 17 wherein the cutting forms and presses the cut ends of the wire to taper the ends as cut, and to remove the insulation from another two opposite sides of the wire.

19. The method of claim 17 further comprised of actuating a wire retainer before the cutting, the wire retainer being disposed to retain a length of conductor on the shaping member, and increasing the spacing between the cutter and the shaping member before bending the conductor around the shaping member.

20. The method of claim 19 wherein increasing the spacing between the cutter and the shaping member is done by moving the shaping member.

21. The method of claim 17 wherein the feeding of the wire is done using a feeder having a fixed wire grabber and a moveable wire grabber, the feeder being positioned to feed the wire from a position after the wire is straightened and ground.

22. The method of claim 21 wherein the moveable wire grabber is configured to feed a length of wire equal to a length of conductor to be bent into the hairpin shaped preformed conductor plus the length of the portion of the wire removed by the punch and die by a single stroke of the moveable wire grabber.

23. The method of claim 22 wherein the stroke of the moveable wire grabber, the position of the grinder and the position of the cutter along the path of travel of the conductor are automatically variable to controllably vary the predetermines spacing on the conductor, thereby controllably providing conductors of at least two different lengths.

* * * * *